July 21, 1925.
G. G. GERBER
1,546,486
WINDSHIELD
Filed July 3, 1924
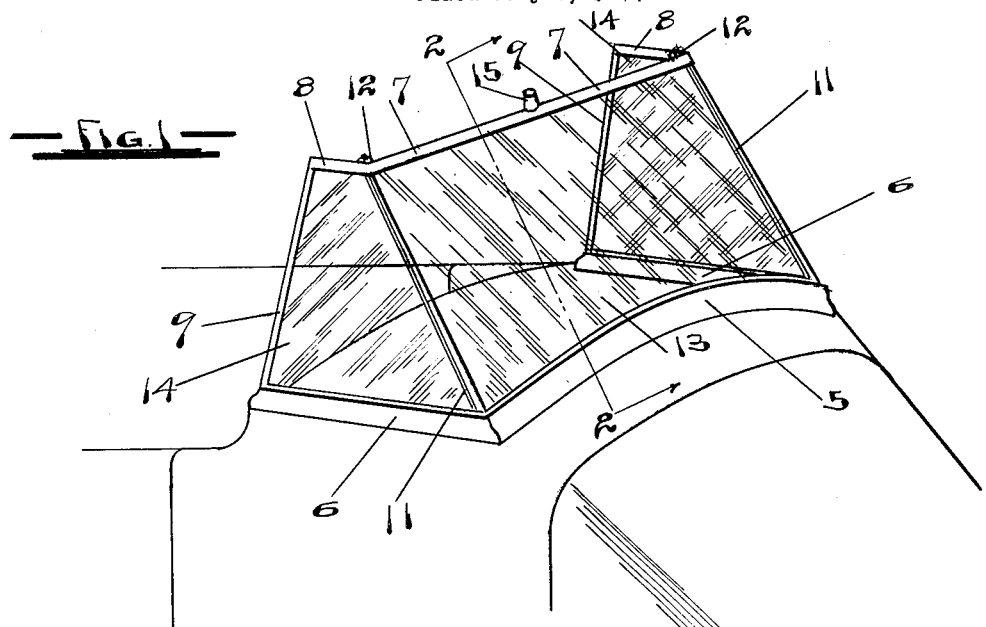
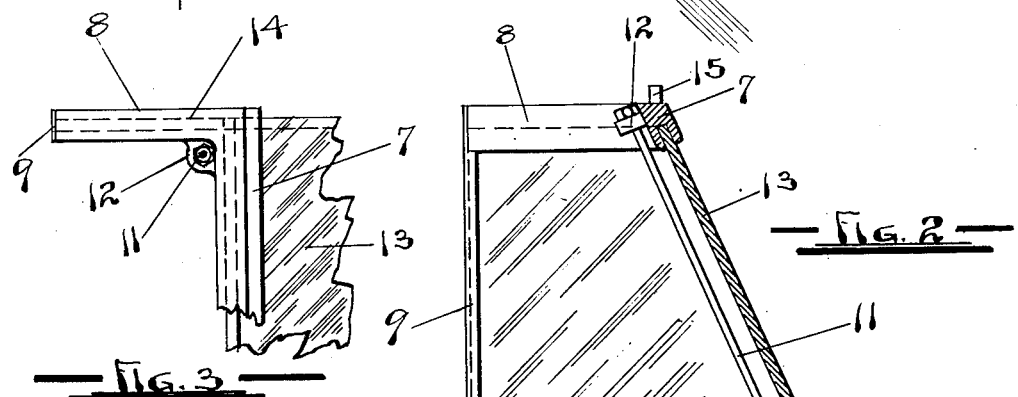
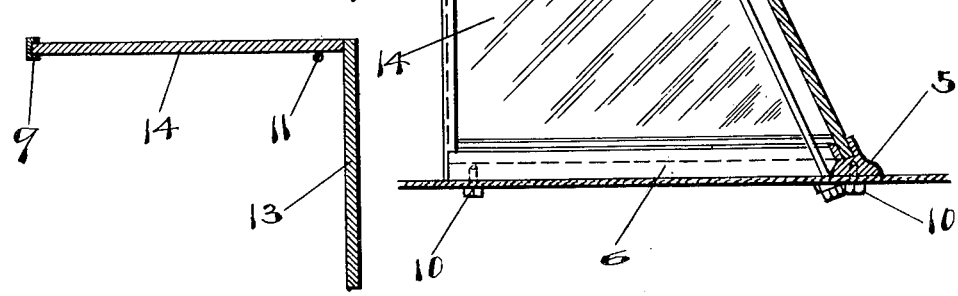
INVENTOR
GEORGE G. GERBER
BY C. J. Blake
ATT.

Patented July 21, 1925.

1,546,486

UNITED STATES PATENT OFFICE.

GEORGE G. GERBER, OF PORTLAND, OREGON.

WINDSHIELD.

Application filed July 3, 1924. Serial No. 724,075.

*To all whom it may concern:*

Be it known that I, GEORGE G. GERBER, a citizen of the United States, residing at Portland, county of Multnomah, State of Oregon, have invented certain new and useful Improvements in Windshields, of which the following is a specification.

My invention relates to windshields in general, and particularly to windshields adapted for use upon automobiles, the object being to provide such a windshield with the usual supporting posts and frames eliminated, and thus to provide a clear vision windshield with no obstructions to sight in its construction. I accomplish this object by means of the construction illustrated in the accompanying drawing which is a part of this application for Letters Patent, like characters of reference indicating like parts throughout the several views thereof, and in which:

Fig. 1 is a perspective view of my device.

Fig. 2 is a section upon line 2—2 of Fig. 1 drawn upon an enlarged scale.

Fig. 3 is a plan view of the corner construction of the upper frame.

Fig. 4 is a section upon line 4—4 of Fig. 2.

In general my device consists of a glass shield set in suitable upper and lower frames, the latter being secured upon the cowl of the automobile, and said frames being connected by a suitable bolt, thus clamping the glass between the frames.

The lower frame is formed of a portion 5 curved to fit the cowl transversely thereof, and rearwardly extending arms 6 upon the extremities of the curved portion. A groove or rabbet is disposed upon the upper edge of said frame within which the glass shield is fitted.

The upper frame is similar to the lower frame except that the transverse portion 7 is not curved, and is provided with rearwardly extending arms 8, said arms being preferably shorter than the arms 6 of the lower frame. A groove or rabbet is provided upon the lower edge of the upper frame to receive the glass..

The upper and lower frames are connected at the extremities of their respective arms 6 and 8 by a member 9, said member being preferably channel shaped as shown in Fig. 4 to receive the glass therein.

The lower frame is secured upon the automobile cowl by suitable bolts 10, and a threaded rod 11 is passed through the cowl and through a lug 12 in each corner of the upper frame, thus binding the two frames tightly upon the intermediate glass shields.

The glass shield is preferably made in three sections, a front section 13 and two side sections 14, the front section overlapping the side sections as shown at the corner of Fig. 4.

The upper frame is provided with a stud 15 for securing the automobile top.

By this construction I provide a windshield without the usual standards and swinging frames, and therefore without any obstructions to the sight.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. A pair of channeled frames with rearwardly extending arms upon the extremities thereof, one of said frames being curved to fit upon an automobile cowl; sheets of glass mounted between said channeled frames; and a tie rod connecting the corners of said frames to clamp the sheets of glass therebetween.

2. A pair of channeled frames; rearwardly extending arms upon the extremities of said frames; a member connecting the ends of said arms; a tie rod connecting the corners of said frames; and sheets of glass mounted between said frames.

3. An automobile windshield composed of three sheets of glass, a front glass and two side glasses, said front glass contacting with the edge of each of said side glasses without any connecting frame at said contact point; two frames substantially horizontally disposed, one above and one beneath said sheets of glass; and means to clamp said frames together with said sheets of glass therebetween.

In witness whereof I claim the foregoing as my own I hereunto affix my signature in the presence of two witnesses at Portland, county of Multnomah, State of Oregon, this 28th day of June, 1924.

GEORGE G. GERBER.

Witnesses:
L. J. ROBINSON,
C. F. BLAKE.